Fig. 4
Fig. 5
Fig. 6
Fig. 7

PHILIP H. SCHMIDT
INVENTOR
BY
BUCKHORN, BLORE, KLARQUIST & SPARKMAN
ATTORNEYS

March 26, 1968 P. H. SCHMIDT 3,374,927
TAPPING ARRANGEMENT FOR CONTAINERS
Filed May 19, 1967 6 Sheets-Sheet 5

PHILIP H. SCHMIDT
INVENTOR
BY
BUCKHORN, BLORE, KLARQUIST & SPARKMAN
ATTORNEYS

United States Patent Office 3,374,927
Patented Mar. 26, 1968

3,374,927
TAPPING ARRANGEMENT FOR CONTAINERS
Philip H. Schmidt, Olympia, Wash., assignor to Olympia Brewing Company, Olympia, Wash., a corporation of Washington
Continuation-in-part of application Ser. No. 444,671, Apr. 1, 1965, which is a continuation-in-part of application Ser. No. 554,245, May 2, 1966. This application May 19, 1967, Ser. No. 639,809
17 Claims. (Cl. 222—82)

ABSTRACT OF THE DISCLOSURE

A cask tapping arrangement including a tap rod unit for the cask wherein the tap rod unit has a replaceable puncturable disc which seals the upper ends of parallel, offset, liquid outlet and gas inlet passageways, and wherein a tapper unit mounts on the tap rod unit and has puncture tubes for puncturing said disc in register with said passageways.

The present application contains not only the subject matter of my prior copending application entitled, "Tapping System for Containers," Ser. No. 554,245, filed May 2, 1966, now abandoned, but also additional matter. The just mentioned application contains not only the subject matter of my earlier filed application entitled "Tapping System for Containers," Ser. No. 444,671, filed Apr. 1, 1965, now abandoned, but also additional subject matter, and was copending with such earlier filed application. Benefit of the filing dates of said prior and said earlier applications is hereby claimed to the extent permitted by law.

Background of invention

*Field of invention.*—The present invention relates to the art of tapping containers and particularly casks and more particularly beer kegs in connection with establishments serving beer on tap, wherein gas under pressure is injected into a keg to expel beer from the keg to a spigot where the beer may be dispensed at the will of the attendant.

The patents cited against the applications above referred to are known to be prior art. Among the problems solved by the present invention is the provision of a simple mounting and retaining arrangement for a randomly oriented, freely supported, replaceable, elastomer sealing disc and for a tapper unit for the disc which parts are so related and constructed as to achieve sealing of the keg before puncture, sealing around the puncture tubes after puncture, and sealing of the keg to an effective extent after withdrawal of the tapper unit.

Summary of the invention

The invention contemplates (1) a tap rod unit for the cask or keg wherein the tap rod unit has parallel but offset liquid and gas passageways and replaceable elastomer sealing means or disc for sealing said passageways; (2) a tapper unit to be mounted on the tap rod unit and having puncture tubes for puncturing said sealing means in sealing relation thereto and in registry with said passageways; and (3) one or more of the following features: (a) a fixed lug means in the well of the cask onto which a sealing means retainer and the tapper unit both latch; (b) guide means whereby the tapper unit is disposed with its puncture tubes in register with the liquid and gas passageways; (c) a double cap construction whereby an inner cap secures the sealing means in place on a raised tap bung and assures a sealing relation of the sealing means and the puncture tubes, and whereby an outer cap carries the puncture tubes and telescopes over the inner cap in guided relation thereto, and wherein both caps are latched in fixed relation to the keg; (d) a tapper unit having a mounting cap and a prong unit movably mounted thereon and releasably held in inoperative position by a double function latch which also secures the mounting cap on the tap bung of the cask; and (e) a raised tap bung which provides a seat for a sealing disc and carries fixed selectably engageable lugs onto which the sealing disc cap and tapper unit latch are properly latched; and (f) other features described hereinafter.

Drawings

Figures 1, 2, 3:
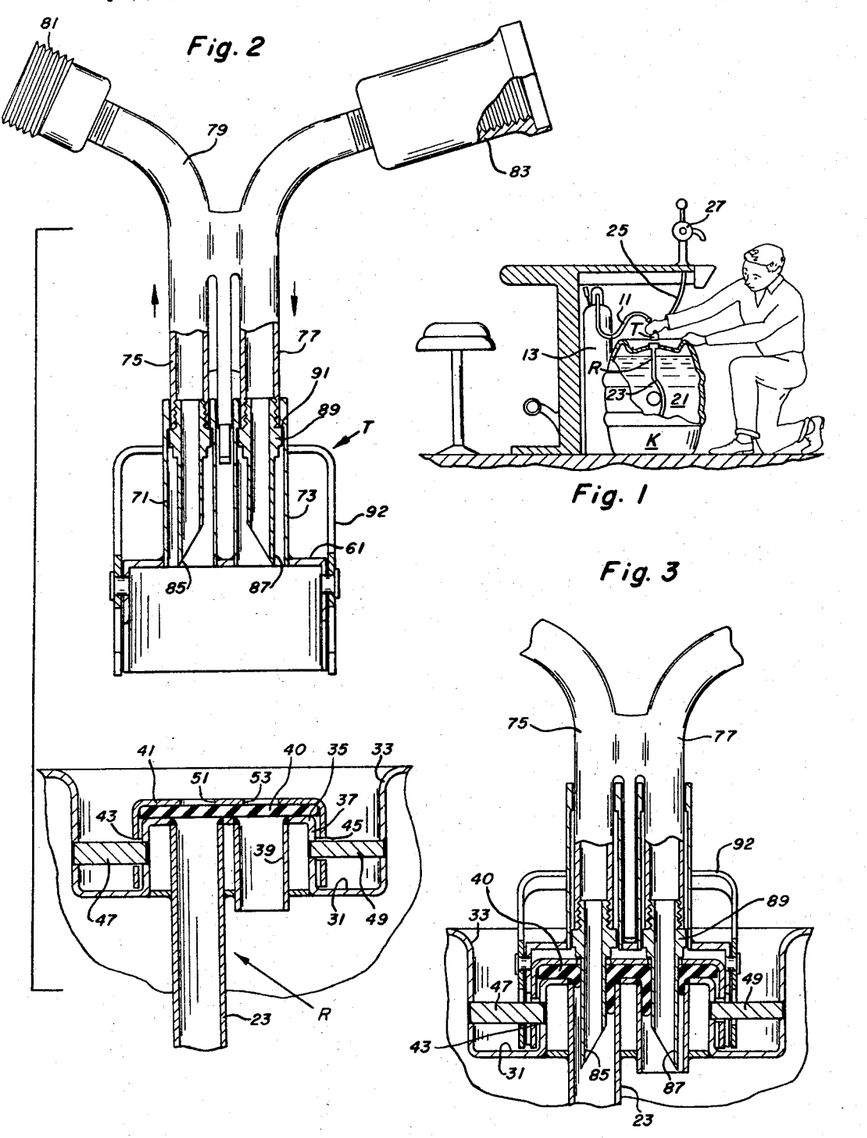
FIG. 1 is a cross sectional view of a bar showing a keg equipped with a tap rod unit of the present invention about to be tapped by means of a tapper unit of the present invention.
FIG. 2 is an enlarged fragmentary, elevational view of the tapper and tap rod units, with portions of both shown in vertical midsection.
FIG. 3 is a view like FIG. 2, but showing the tapper unit mounted and secured in tapping position.

FIG. 1 shows a typical use of the tap system of the present invention. Gas under pressure is conducted by a hose 11 from a source 13 to a tapper unit T of the present invention. The unit is designed to be mounted on a tap rod unit R which in turn is mounted on a cask in the form of a keg K. Thus gas from the hose 11 will be conducted to the interior of the keg K to force the liquid contents 21 thereof upwardly through a hollow tap rod 23 to a hose 25. The latter conducts the liquid to a spigot 27 or other discharge means.

The tap rod unit R includes the tap rod 23 which provides a liquid passageway and which projects upwardly through an insert piece (FIG. 2) which forms the central portion of the floor 32 of a well 33 formed in the top of the keg K. The tap rod is secured at its upper end to the top wall 35 of a raised tap bung 37 which is mounted in the well 33 and which is shown as being formed as an integral continuation of the walls of the well. A gas passageway 39 is provided by a short tube section which is secured to the top wall 35 of the bung and to the insert piece 31.

Figure 7:
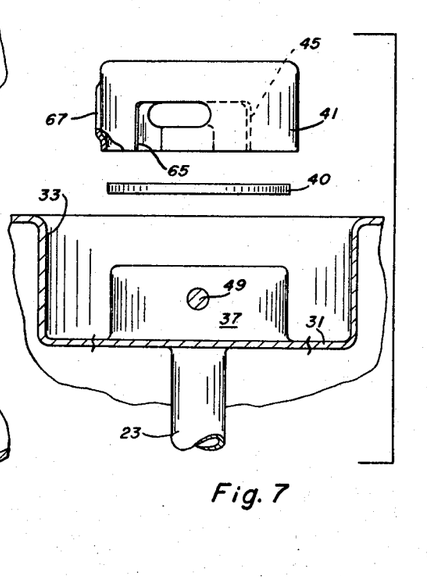
FIG. 7 is an exploded view of the tap rod unit in side elevation, the well being shown in the same manner as it is shown in FIG. 4.

An elastomer sealing disc 40 rests freely in randomly oriented fashion on the top wall 35 of the tap bung 37 in superposed relation to the tap rod 23 and gas inlet tube 39 and is held in compressed sealed relation with the upper ends thereof by retainer cap 41. Such cap fits over the tap bung 37 and has bayonet slots 43 and 45 (FIGS. 2 and 7) receiving fixed wing lugs 47 and 49, the latter being fixedly mounted in the well 33 one on either side of the tap bung 37 and being of circular cross section.

The lugs 47 and 49 and the slots 43 and 45 are designed so that the cap can be mounted on the raised bung 37 in one position only (for reasons presently to appear). To accomplish this purpose lug 47 is made to have a larger diameter than lug 49 and slots 43 and 45 (FIG. 7) are sized accordingly. The lugs could be of different shapes than that shown to achieve the desired result.

The top wall 40 of cap 41 is formed with a pair of guide holes 51 and 53 which are spaced apart the same distance as that between the tap rod 23 and the gas outlet tube 39, and are so related to the bayonet slots 43 and 45 that when the cap is mounted on the tap bung 37 the hole 51 is aligned or in register with tap rod 23 and hole 53 is aligned with or in register with the gas outlet tube 39.

It is contemplated that a keg will be sent from the brewery with the tap rod unit R in its closed sealed condition of FIG. 2. The tapper unit T will normally be sent to an establishment separately from the tap rod unit R or to the establishment may in advance have been supplied with one. Thus such a keg is securely sealed until it is tapped. It is further pointed out that the tap rod unit is preferably fully recessed within the top of the keg (as shown in FIG. 2) so that it cannot be damaged.

Figure 4:
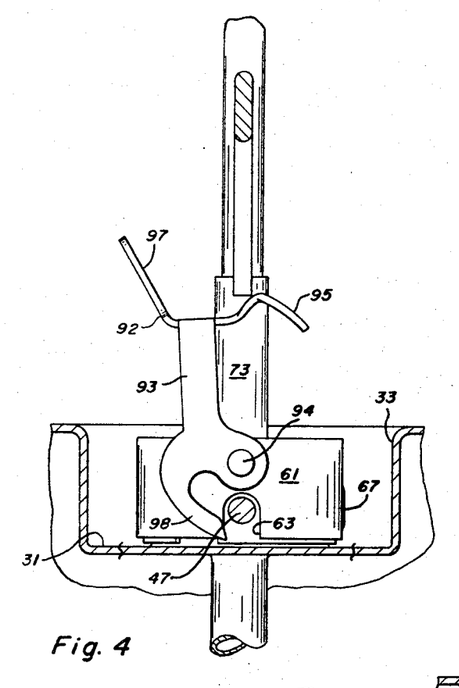
FIG. 4 is a fragmentary elevational view of the tapper and tap rod units taken in a direction at right angles to the positions shown in FIG. 3, with the tapper unit mounted but not secured in tapping position and with the vertical wall of the well being shown at midsection but with the floor or bottom of the well being shown as sectioned forwardly of midsection for convenience of illustration.

The tapper unit T comprises a mounting cap 61 which is dimensioned to telescopically fit over the tap rod unit cap 41 in one position only because a wide slot 63 (FIG. 4) in the cap is designed to fit the large lug 47 while a narrow slot 65 (FIG. 2) is designed to fit the smaller lug 49. Also a key 67 on the inner cap 41 fits in a key slot 69 formed in the outer or upper cap 61. The key is not essential because the lugs 47 and 49 assure proper application of the tapper unit T to the tap rod unit, but the key 67 and slot 69 serve as a visual aid to rapid, proper application.

Figure 5:
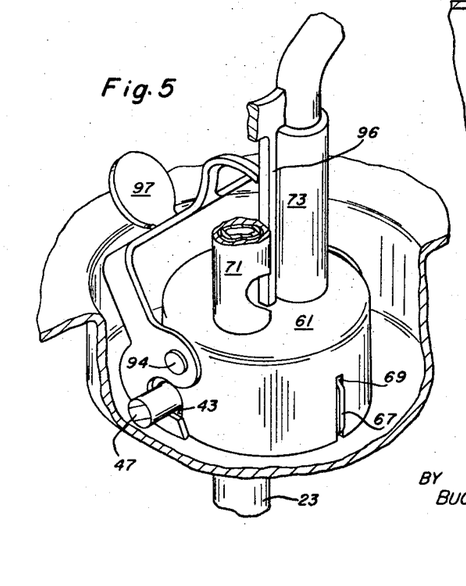
FIG. 5 is a fragmentary perspective of the tapping assembly with the tapper unit mounted and secured in place.
Figure 6:
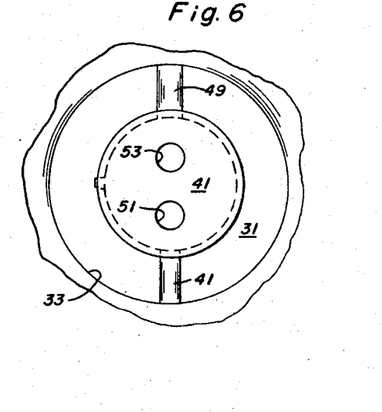
FIG. 6 is a fragmentary plan view of the well showing the tap rod unit in place.

Cap 61 has rigidly secured thereto a pair of upstanding guide tubes 71 and 73 (FIGS. 2 and 5) which slidably receive the lower ends of a liquid puncture tube 75 and a gas puncture tube 77. The tubes are joined by a web 79 to provide a tube unit. The upper ends of the tubes are bent outwardly and provided with fittings 81 and 83 for connection to complementary fittings on the ends of the hoses 11 and 25, respectively. A suitable manual control valve (not shown) could be mounted on each of the fittings 81 and 83, or otherwise interposed between the tubes 71 and 73 and the gas bottle 13 and spigot 27, respectively.

The guide tubes 71 and 73 are so located on the cap 61 that when the cap is in its operative mounted position (FIGS. 3 and 5) the tubes will register with the guide holes 51 and 53 of the inner or lower mounting cap 41.

The lower ends of the puncture tubes are provided by hollow puncture prongs 85 and 87 which are threaded at their upper ends into the lower ends of the upper sections of the puncture tubes. A collar 89 formed on each prong engages a shoulder 91 formed on the associated guide tube to limit upward movement of the prong and such collar slidably engages the interior of the associated guide tube.

The tube unit is releasably held in a raised inoperative position by a double function latch member 92 which is generally of inverted U shape with the legs 93 of the member being pivoted at 94 on the outer cap 61. In the position shown in FIG. 4, an extension portion 95 of the latch member snaps under a depending finger 96 on the tube unit to releasably retain the tube unit in the raised inoperative position of FIG. 2.

The latch member has a handle portion 97 by which it may be turned counterclockwise (FIGS. 4 and 5) to move lower hook portions 98 thereof into engagement with the fixed lugs 47 and 49. In such position of the latch member, the extension portion 95 clears the finger to enable the tube unit to descend. Downward pressure on the tube unit will cause it to puncture the disc 40 as shown in FIG. 3, the prongs 85 and 87 being sufficiently smaller in diameter than that of the tap rod and gas outlet tube 39 that portions of the disc are extruded into the annular spaces between prongs and tap rod and gas tube to form an effective seal against the escape of gas or liquid. The finger 96 bottoms on the outer cap 61 to limit downward movement of the tube unit.

The puncturing of the disc is such that generally semi-circular slits are formed therein to provide flaps which snap back into position when the tapper unit is removed to reseal the keg against the entrance of dirt or foreign matter into it.

FIGS. 8–12 show a modified form of tapping system which primarily differs from that shown in FIGS. 1–7 in three respects: first, the puncture tubes 85a and 87a are immovably mounted directly on the tapper unit cap 61a rather than being movably mounted with respect thereto; secondly, the tap or tapper unit T latches onto wing lugs carried by the inner cap 41a rather than onto lugs carried by the raised tap bung; and thirdly, the tap rod unit is a separate entity from the raised tap bung and is removably mounted on the raised tap bung.

Now, to the specific description. There is a hollow tap bung 37a secured in the well 33a and having at its upper end an integral annular flange or head 201 upon which is seated a circular gasket 203. The latter has a pair of holes 205 (FIG. 10) through which project the upper ends of a tap rod 23a and a gas inlet or guide tube 39a. Such upper ends are secured in holes in a mounting disc or head 207 which rests on the gasket 203.

The mounting disc 207 has an upstanding eccentrically located orientation pin 209 which passes through aligned holes 211 and 213 in a sealing disc 40a and a retaining cap 215. The retaining cap 215 is formed with a pair of ports 217 and 219 which are disposed in register with the guide tube 39a and the tap rod 23a, respectively. The orientation pin 209 maintains this in-register relationship during turning movement of the retaining cap 215, the cap being turned to bring a pair of wing lugs 221 and 222 under a pair of hold-down stops or lugs 223 provided on the keg 225 in the well 33a. The hold-down stops are of angular form in cross section (FIGS. 11 and 12) to provide depending stop portions 227 to be engaged by the wing lugs 221 and 222 and thus limit turning movement of the cap 215 and retain the lugs 221 beneath the stops 223. The parts are so dimensioned that the sealing disc 40a must be compressed somewhat in order for the lugs 221 and 222 to fit under the stops 223. This means that the bung 37a of the keg 225 is sealed closed when the closure unit is in its final locked position on the keg 225.

The tap unit T includes a head or cap 61a having a pair of puncture tubes or prongs 87a and 85a, each having a nut 231 for threading into a threaded hole provided in the interior of the gas supply nipple 77a (for prong 87a) and in the beer discharge nipple 75a (for prong 85a). Thus, the prongs may be replaced when the points thereof become dull.

The skirt 233 of the head or cap 61a has a pair of slots 235 and 237 formed therein, slot 235 being wider than the slot 237. It is evident from FIG. 11 that lug 222 has notches 239 formed therein to provide a narrow portion to receive the narrow slot 237, while the wide slot 235 fits over the effectively wider lug 221. However, the narrow slot 237 cannot fit over the lug 221. Thus, the tap unit T can be placed on the tap rod unit R in only one position of the former relative to the latter. This assures that the prongs 87a and 85a will not only register with the ports in the retaining cap 215, but that the gas pressure prong 87a will register with port 217 (which in turn registers with the gas pressure guide tube 39a) and that beer discharge prong 85a will register with port 219 (which in turn registers with the tap rod 23a).

Figures 8, 9, 10:
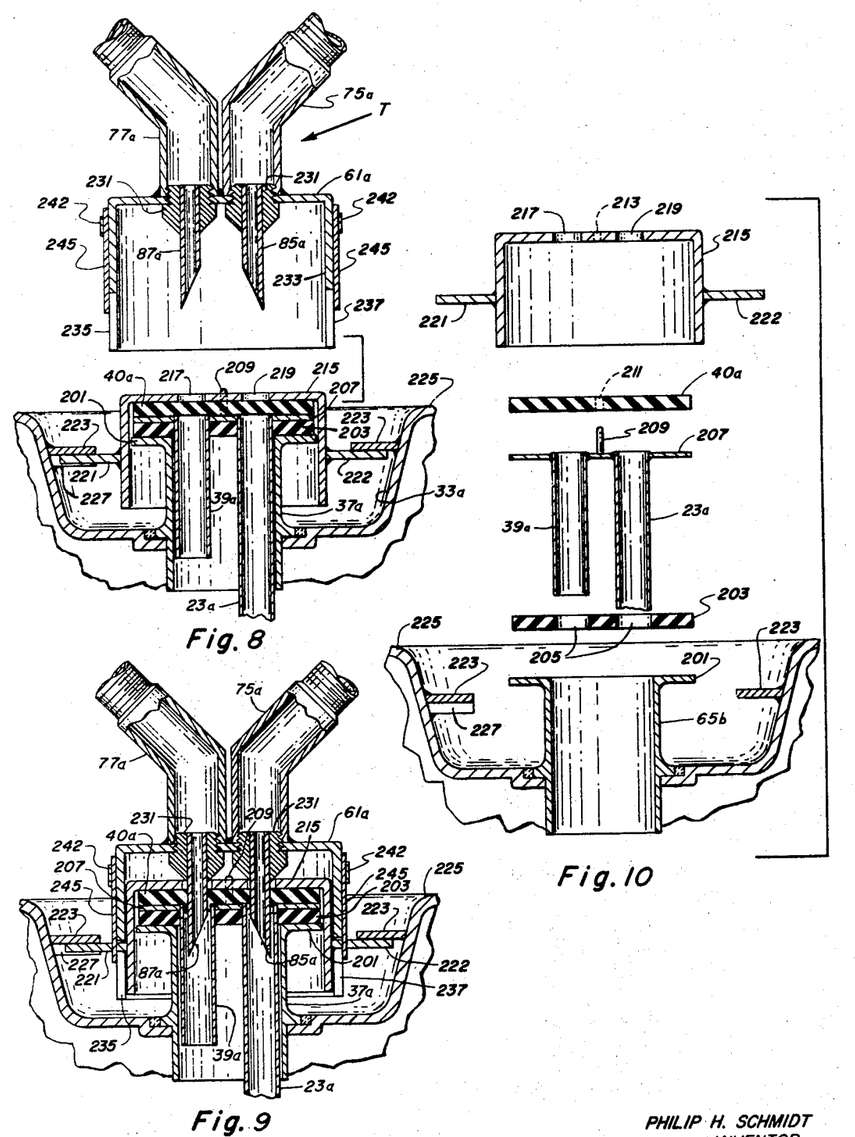
FIG. 8 is a view like FIG. 2 but showing a modified form of tapping system.
FIG. 9 is a view showing the tapper unit in its tapping position on the tap rod unit.
FIG. 10 is an exploded view of the tap rod unit.
Figure 11:
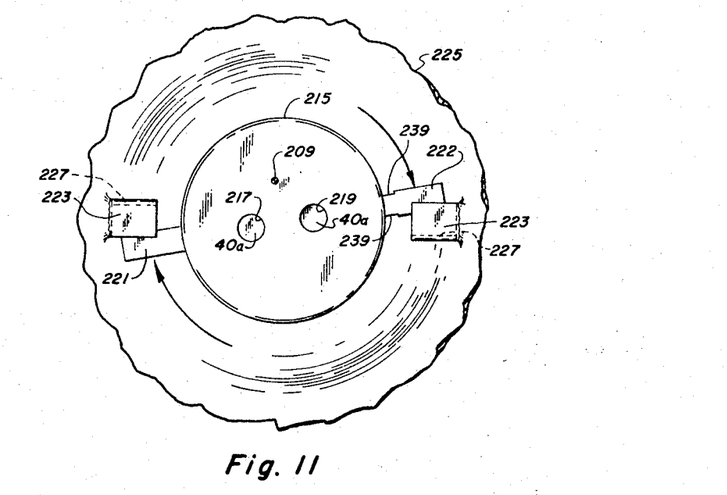
FIG. 11 is a fragmentary plan view of the tap rod unit of my system.
Figure 12:
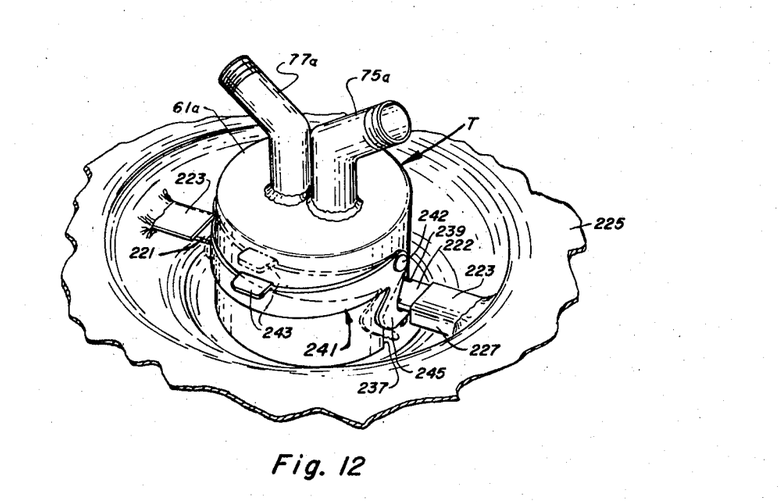
FIG. 12 is a fragmentary perspective view of the modified tapping system.

The head or cap 61a carries a locking member in the form of a bail 241 (FIG. 12) which is pivotally mounted at its ends 242 on the head or cap 61a. The locking member has a finger engaging tab 243 by which it may be manipulated. The locking member has a pair of hooks, one 245, being shown in FIG. 12, for fitting under the latching lugs 221 and 222 on the retaining cap 215. Thus the tapper unit T can be releasably locked in place on the tap rod unit R, with the prongs 87a and 85a penetrating the sealing disc 40a as shown in FIG. 9.

FIGS. 13–20 show another modified form of the invention which differs from the form in FIGS. 1–7 in three primary respects: first, in that the puncture tubes 85b and 87b are fixedly secured to the tapper unit mounting cap 61b; secondly, in that the mounting cap is not latched in place when in its operative position; thirdly, in that the sealing disc 40b is held in place by a retainer disc instead of a retaining cap.

Now, to the detailed description. Hoses 27 and 29 lead to plug valves 341 and 343 which are mounted on nipples 345 and 347, the latter being secured to the top 349 of a mounting cap or head member 61b.

Secured to and depending from the top 349 are a pair of puncture tubes to hollow prongs 87b and 85b which are in communication with the interior of the nipples 345 and 347, respectively. As shown in FIG. 2, the prongs are symmetrically disposed one on either side of the center of the top 349.

Figure 14:
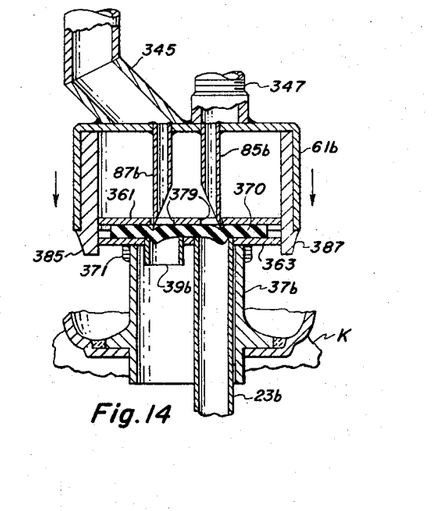
FIG. 14 is a sectional view showing initial contact between the tapper unit and closure or tap rod unit.
Figure 15:
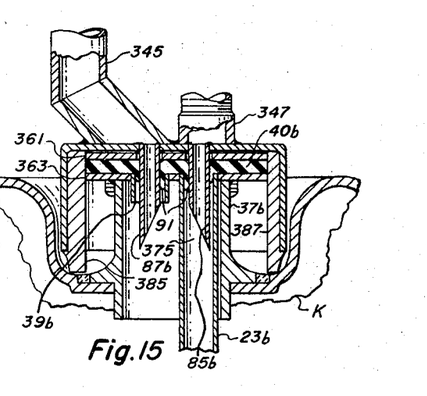
FIG. 15 is a view like FIG. 14 but showing the tapper unit fully in place.

The internal diameter of the cap 61b is slightly larger than the diameters of the upper and lower disc plates 361 and 363 of a tap rod unit R to enable the cap 61b to fit over such plates as shown in FIGS. 14 and 15. Plate 363 is secured such as by welding to a raised hollow tap bung 37b which is secured in a well 33b in the top end of the keg by welding 367.

There is an elastomer sealing disc 40b disposed between the disc plates 361 and 363 and retained in place by four screws 271 (FIGS. 13 and 18) which pass through plate 361 and thread into plate 363 to clamp the elastomer sealing disc between the plates 361 and 363.

The sealing disc 40b closes a pair of ports 373 and 375 provided in the lower plate 363 by the upper end portions of a gas inlet or guide tube 39b and the tap rod 23b. The ports 373 and 375 register with a pair of openings 379 formed in the upper plate 361.

Figure 13:
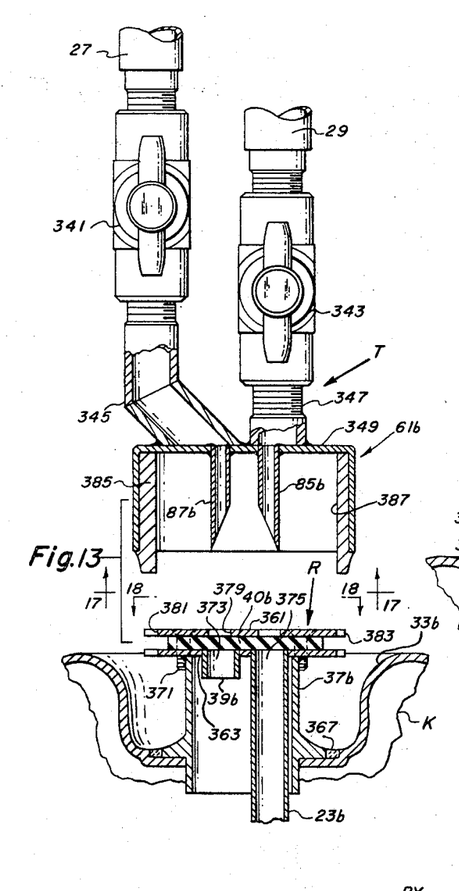
FIG. 13 is a view like FIG. 2 of another modified form of tapping system.
Figures 17, 18, 20:
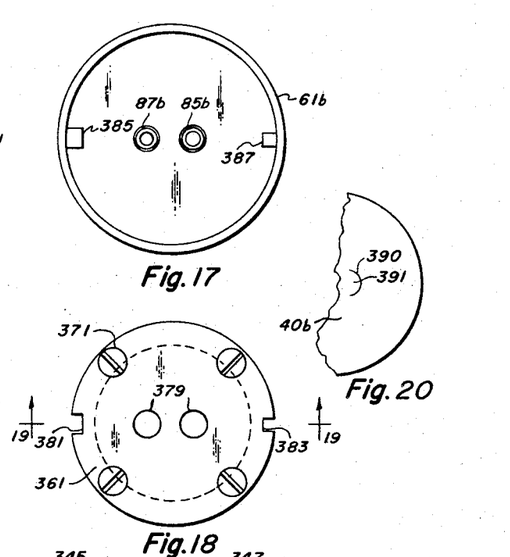
FIG. 17 is a bottom view of the tapper unit taken in the direction of the arrows 17—17 of FIG. 13.
FIG. 18 is a plan view of the tap rod unit taken in the direction of the arrows 18—18 in FIG. 13.
FIG. 20 is a fragmentary plan view of a sealing disc after use thereof.

Referring to FIGS. 13, 17 and 18, the plates 361 and 363 have diametrically opposed pairs of notches 381 and 383, notches 381 being deeper than notches 383. Those notches receive and accommodate a pair of lugs 385 and 387 provided on the interior of the cap 61b, lug 385 being wider than lug 387. The lugs project downwardly farther than the prongs 87b and 85b and thus engage the upper plate 361 before the prongs reach the plate.

The prongs 87b and 85b have beveled lower ends to provide sealing-member-penetrating end portions on the prongs.

To apply the tapper unit T to the keg K, a check is made to be sure that the valves 341 and 343 are in closed condition. Then the tapper unit T is maneuvered until the lugs 385 and 387 are in register with the notches 381 and 383, respectively, the lug 385 being too large to fit in the notches 383 whereby there is assurance that the gas conducting prong 87b will register with port 373 and the liquid conducting prong 85b will register with the tap rod 23b. Then the tapper unit T is pressed downwardly to bring the prongs 87b and 85b into engagement with the sealing disc 40b as shown in FIG. 14. Continued downward pressure on the tapper unit T will force the prongs through the sealing disc, as shown in FIG. 15, to place the gas hose 27 in communication with the interior of the keg at the upper portion thereof and the hose 29 in communication with the keg at the lower portion thereof. Then the valves 341 and 343 are opened to supply beer under pressure at the associated spigot (not shown).

After the keg K has been drained or emptied, the tapper unit can be pulled off such keg and mounted on an adjacent keg (not shown) which would be located next to keg K. Additional adjacent kegs can be similarly emptied.

Figure 16:
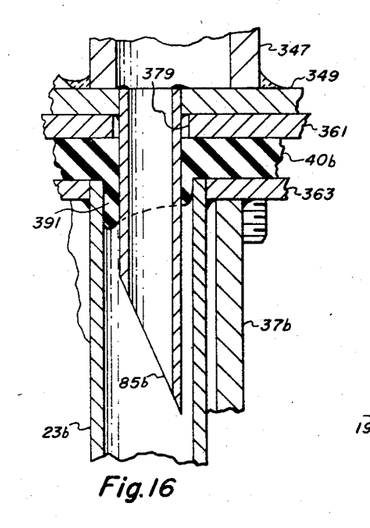
FIG. 16 is an enlarged view of a portion of FIG. 15 better showing the tapping relationship between a penetrating prong of the tap unit and the closure seal or disc.

It is pointed out that the sharpened prongs 87b and 85b do not cut out a plug of material from the sealing disc as they penetrate it, but cut a roughly semicircular slit 390 therein as shown in FIG. 20. This leaves a flap 391 of material for each port that is forced downwardly thereinto as shown in FIG. 16, in the case of port 375. The prongs and the guide tube and tap rod are so dimensioned that the annular space between a prong and its surrounding member (guide tube or tap rod as the case may be) is large enough to accommodate the flap 391. Preferably the size of the annular space is less than the thickness of the sealing member 40b so that each flap 391 is squeezed between the associated prong and its surrounding member. This creates a tight sealing fit which holds the head unit against inadvertent dislodgment such as might occur because of the gas pressure in the keg tending to force the head unit upwardly (depending of course on the sizes of the prongs relative to the weight of the head unit).

After removal of the head unit from a keg, the flaps 391 snap back into place and form an effective seal against the entrance of dust and dirt into the keg and prevent the empty keg from being used as a cigarette butt disposal unit.

Figures 19, 21, 22, 23:
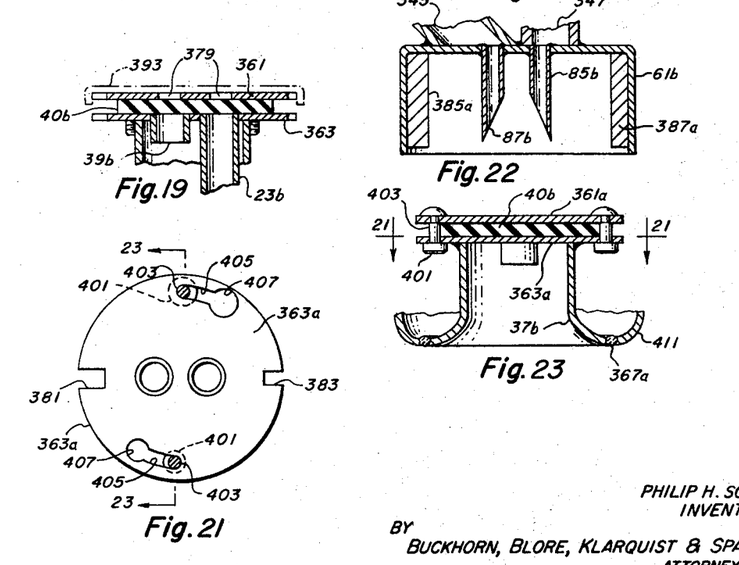
FIG. 19 is a vertical sectional view taken along line 19—19 of FIG. 18.
FIG. 21 is a top view of still another modified form of tap rod unit taken along line 21—21 of FIG. 23.
FIG. 22 is a vertical midsectional view of a modified form of tapper unit for use with the tap rod unit of FIG. 21.
FIG. 23 is a vertical sectional view taken along line 23—23 of FIG. 21.

FIG. 19 shows that preferably the closure unit has a snap on removable cap 393 to cover the openings 379 and prevent accidental puncturing of the sealing disc 40b while handling the keg. Before the keg is tapped, the cap is removed. It is pointed out that the disc 40b is effective, prior to puncturing thereof, to maintain pressure in the keg, the keg being placed under pressure to prevent the beer from going flat. Further, it has been observed that if the tapper unit T is temporarily removed from the keg prior to emptying the same, the flaps 391 are usually effective to retain some pressure within the keg.

FIGS. 21–23 show a modified form of the FIG. 13–20 form of my invention wherein the screws are dispensed with and instead a pair of bayonet joints are employed. Each of such joints includes a headed pin mounted on the upper plate 361a and having a head 401 and a shank 403, the latter fitting within the narrow portion 405 of a keyhole slot formed in the lower plate 363a. Each keyhole slot has a head-passing enlarged portion 407. The shanks 403 of the pins are of such length that the heads can be passed downwardly through the keyhole portion 407 and under the lower plate 363a by compressing the sealing disc 40b between the plates. This forms a seal between the sealing disc 40b and the upper face of the lower plate 363a to prevent gas under pressure from gaining direct access to the liquid conducting prong 85b.

FIG. 22 shows that the tapper unit T has prongs 87b' and 85b' but these are shorter relative to the depth of the cap 61b' than are the prongs 87b and 85b with regard to cap 61b so that the lower ends of the prongs terminate short of the bottom edge of the head member. Also, the lugs 385a and 387a terminate short of such bottom edge but extend below the points on the prongs 87b' and 85b'. With this construction, the head member can be placed on the closure unit in surrounding relation to the plate 361a with the lugs 385a and 387a riding on such plate but with the prongs spaced therefrom so that the sharpened ends thereof are not dulled. The head unit is now turned until the lugs drop into the notches 381 and 383 of the plate whereupon the prongs are disposed in register with the holes 379 in the upper plate. Tapping of the keg can now proceed as previously described.

The FIG. 21–23 form of the invention facilitates machine replacement of the discs 40b because the kegs can be conveyed beneath a replacement means which would turn and remove the upper plate 361a, displace the used disc 40b, apply a new disc and replace the upper plate 361a.

With the arrangement of either form of the invention, a series distribution system can be readily set up because the gas prong 87b is large enough to handle liquid as well as gas. In a series system, the gas nipple of the rearmost keg would be connected to the source of gas pressure, but the liquid nipple thereof would be connected to the gas nipple of the next keg. The liquid nipple of such next keg would be connected to the gas nipple of the following keg and so on until the foremost keg were reached. The liquid nipple of the foremost keg would be connected to the spigot on the bar.

It will be appreciated that the sealing disc 40b performs two functions, closing the keg until it is punctured, and then forming a seal to prevent direct access of the gas from the gas prong to the liquid prong after the seal is punctured.

It will be further appreciated that the type of tapper unit T shown in FIG. 22 could be used in connection with the first form of the invention instead of the head used therein. In connection with FIG. 23, it is pointed out that the tap bung 37b' is of different construction from the tap bung 37b in FIG. 15. The tap bung 37b' is welded at 367a to the top end 411 of the keg.

Having described the invention in what is considered to be the preferred embodiment thereof, it is desired that it be understood that the invention is not to be limited other than by the provisions of the following claims.

I claim:

1. In combination:
a keg having a head which includes a cylindrical member defining a tap opening for the keg,
said cylindrical member terminating at its upper end in an outwardly extending annular flange,
a removable closure unit for said tap opening comprising a tap rod member and a disc shaped head element, said tap rod member eccentrically secured to said head element in register with a hole therein,
said head element having a second hole eccentrically located in said head element,
said head element overlying said flange with said tap rod member projecting through said tap opening and into said keg,
sealing means between said head element and said flange,
a replaceable puncturable elastomer sealing disc freely resting on the upper surface of said head element,
retainer means clamping said sealing disc against said head element and applying a clamping force between said head element and said flange,
latch means for detachably connecting the retainer means to the keg to facilitate replacement of said sealing disc after it has been used,
a tap unit including a body having a pair of puncture tubes for puncturing said sealing disc,
one tube being a liquid discharge tube and the other being a gas inlet tube,
guide means providing for engagement of said body with said closure unit in one position only, circumferentially speaking, of said tap unit and closure unit so that said liquid discharge puncture tube punctures said disc in register with said tap rod member and said gas inlet tube punctures said sealing disc in register with the second mentioned hole,
and means for detachably connecting said tap unit to said keg after said tap unit is in its tapping position.

2. A combination as set forth in claim 1 in which the puncture tubes are removably mounted on the tap unit body,
said retainer means including a plate portion overlying said sealing disc and having a pair of holes therein for receiving said puncture tubes,
said head element carrying an eccentric upstanding orientation pin passing through openings in said sealing disc and plate portion to align the holes in said plate portion with the holes in said head element.

3. A combination as set forth in claim 1 in which
said retainer means is in the form of a cap positioned over said sealing disc, head element and sealing means and having laterally extending wing lugs,
said cap being open in the portions thereof which register with said tap rod and said second hole in said head element to facilitate puncturing said sealing disc by said puncture tubes,
said keg having latch lugs for receiving said wing lugs in overlying relation with respect thereto,
said latch lugs being located so that said cap must compress said sealing disc in order for said wing lugs to fit under said latch lugs,
and stop means for releasably retaining said wing lugs beneath said latch lugs.

4. A combination as set forth in claim 1 in which the puncture tubes are removably mounted on the tap unit body,
said retainer means including a plate portion overlying said sealing disc and having a pair of holes therein for receiving said puncture tubes,
said head element carrying an eccentric upstanding orientation pin passing through openings in said sealing disc and plate portion to align the holes in said plate portion with the holes in said head element,
said retainer means being in the form of a cap positioned over said sealing disc, head element and sealing means and having laterally extending wing lugs,
said keg having latch lugs for receiving said wing lugs in overlying relation with respect thereto,
said latch lugs being located so that said cap must compress said sealing disc in order for said wing lugs to fit under said latch lugs,
and stop means for releasably retaining said wing lugs beneath said latch lugs.

5. A combination as set forth in claim 1 in which
said retainer means is in the form of a cap having spaced openings positioned over said sealing disc, head element and sealing means and having laterally extending wing lugs,
said keg having latch lugs for receiving said wing lugs in overlying relation with respect thereto,
said latch lugs being located so that said cap must compress said sealing disc in order for said wing lugs to fit under said latch lugs,
and stop means for releasably retaining said wing lugs beneath said latch lugs, said tap unit body being in the form of a second cap having a telescoped fit over said first named cap, said second cap having slots to slidably engage the wing lugs of said first cap, said wing lugs being of different widths at the location of said slots so that said second cap is oriented in a predetermined position relative to said first cap, and said detachably connecting means including latch means on said second cap to engage one set of the lugs heretofore mentioned.

6. A tap assembly for a liquid container having a nipple defining a tap opening for said container, said tap assembly including a closure unit and a tap unit for tapping said container, said closure unit and tap unit constituting separate units from said container, said closure unit including sealing means for sealingly closing said nipple, said closure unit including tap rod conduit means underlying said sealing means and extending through said nipple to the interior of said container and gas conducting conduit means underlying said sealing means and projecting into said nipple, said conduit means being spaced from one another, means for detachably connecting said closure unit to said container with said both conduit means in fixed relation to said container, said tap unit including a body carrying a liquid discharge puncture tube and a gas injection puncture tube, said tubes being spaced from one another the same distance as said conduit means, guide means on said tap unit and closure unit providing for sliding engagement of the two units in one circumferential position only of said tap unit relative to said closure unit, said liquid discharge puncture tube and said gas injection tube registering respectively with said tap rod conduit means and said gas conducting conduit means in said one position, at least one of said conduit means being eccentrically disposed relative to said nipple, said puncture tubes having a length such that they puncture said sealing means during application of said tap unit to said closure unit and when said tap unit is in said one position relative to said closure unit.

7. A tap assembly for a liquid container having an upstanding nipple defining a tap opening for said container, said tap assembly including a closure assembly for said nipple, said closure assembly including a sandwich structure on said nipple including a lower sealing member, a central support disc and an upper puncturable elastomer sealing member, said support disc carrying a tap rod depending therefrom and extending through a first hole in said lower sealing member and into said nipple, said support disc having a first hole registering with said tap rod and a second hole registering with a second hole in said lower sealing member, a first cap detachably and removably fitting over said sandwich unit and having a pair of outwardly extending traveling lugs to engage a pair of fixed lugs on said container, said first cap having a pair of holes to register with the holes in said support disc and lower sealing member, orienting means on said cap and support disc detachably connecting the two to maintain them with the holes therein in registry, a second cap removably fitting over said first cap and carrying a pair of puncture tubes for puncturing said upper elastomer sealing member, and latch means detachably connecting said second cap to said first cap.

8. In a tapping construction for a cask having a well in the upper end thereof, a raised bung in said well, a first passageway leading from said bung down into said cask and through which liquid may be expelled from said cask, a second passageway for said bung providing for the injection of gas into said cask to expel liquid therefrom, the axes of said passageways being parallel but spaced from one another, a replaceable elastomer sealing disc for the upper ends of said passageways, fixed wing lugs mounted in said well in fixed relation to said cask and disposed one on either sides of said bung, a retainer means for said disc fitting down over said bung and against said disc, latch means on said retainer means for engaging said wing lugs after said retainer means has pressed said disc in sealed relationship with said upper ends of said passageways, and tapper means having a pair of puncture tubes for puncturing said disc.

9. A tapping construction as set forth in claim 8 in which there are latch means for latching said tapper means onto said wing lugs.

10. A tapping construction as in claim 8 wherein said well is of such depth that said bung, disc and retainer means are entirely recessed within said well.

11. In a tapping construction for a cask having a well in the upper end thereof, a raised bung in said well, a first passageway leading from said bung down into said cask and through which liquid may be expelled from said cask, a second passageway for said bung providing for the injection of gas into said cask to expel the liquid therefrom, said passageways being non-concentric, a replaceable elastomer sealing disc for the upper ends of said passageways, fixed latch means mounted in said well in fixed relation to said cask, a retainer cap for said disc fitting down over said bung and against said disc, latch means on said cap for engaging said fixed latch means and holding said retainer cap in compressed relation against said disc, and holding said disc in compressed condition against the upper ends of said passageways, said retainer cap being open at the portions thereof which are in register with said passageways, tapper means including a second cap for fitting down over said first cap, and means for latching said second cap in such position, a pair of puncture tubes carried by said second cap for puncturing said disc whereby to provide for the flow of gas through one tube into said second passageway and to provide for the outward flow of liquid from said first passageway through the other puncture tube.

12. A tapping construction as set forth in claim 11, wherein said puncture tubes constitute a unit slidably mounted on said second cap for movement from a non-puncturing to a puncturing position after said second cap is applied to said first cap.

13. A tapping construction as set forth in claim 12, wherein there are means preventing movement of said puncture tube unit from said first position to said second position until after said second cap is in its final position on said first cap.

14. In a tapping arrangement for a cask having a tap bung unit, said unit including a raised tap bung having non-concentric inlet and outlet openings, an elastomer sealing disc overlying said tap bung for sealing said openings, and a retainer cap for said disc having a pair of guide holes therein spaced apart the same distance as said inlet and outlet openings, means for mounting said retainer cap on said bung and means to align said holes with said openings, means for latching said cap downwardly to compress said disc in sealing engagement with said openings, a tapper unit including a mounting cap slidably engaging said retainer cap, said tapper unit including a pair of puncture tubes for passing through said disc in register with said inlet and outlet openings.

15. In a tapping arrangement for a cask having a tap bung unit, said unit including a raised tap bung having non-concentric inlet and outlet openings, puncturable sealing means for sealing said openings, a retainer cap for retaining said sealing means in place and slidably telescoped down onto said tap bung, and having holes therein for register with said inlet and outlet openings, interengaging vertical guide means providing for engagement of said retainer cap on said bung with the retainer cap holes in register with said inlet and outlet openings, holding means for releasably holding said retainer cap in place, and a tapper unit including a mounting cap slidably telescoped down onto said retainer cap, said tapper unit including a pair of puncture tubes for passing through the holes in said retainer cap and puncturing said sealing means and entering said inlet and outlet openings, and vertical guide means for said tapper unit to provide for engagement of said tapper unit in a position with its puncture tubes in register with said inlet and outlet openings.

16. In a tapping arrangement as set forth in claim 15, wherein said holding means includes a pair of fixed wing lugs disposed one on either side of said tap bung, said holding means including means on said retainer cap for engaging said wing lugs, and means on said tapper unit for latchably engaging said wing lugs.

17. In a tapper unit for tapping a cask of the type having a pair of adjacent non-concentric openings sealed by puncturable sealing means, said unit including a pair of puncture tubes for puncturing said sealing means in register with said openings, mounting means for mounting said puncture tubes, said mounting means movably supporting said tubes for movement from an inoperative position on said mounting means to an operative puncturing position, said mounting means having means for mounting said mounting means on said cask, the last named means including a latch means for latching said mounting means in place on said cask, said latching means being movable from an inoperative to an operative position, said latching means carrying means which is the inoperative position of said latch means prevents said tubes from being moved from their inoperative position but freeing said tubes for such movement when said latch means is moved to its operative position.

References Cited

UNITED STATES PATENTS

| 2,090,977 | 8/1937 | Hoffman | 222—89 X |
| 2,158,347 | 5/1939 | Yirava | 222—89 X |
| 2,226,880 | 12/1940 | Tramarollo | 222—81 |
| 3,035,603 | 5/1962 | Jamieson et al. | 222—400.7 X |
| 3,208,639 | 9/1965 | Marwell et al. | 222—83 X |

ROBERT B. REEVES, *Primary Examiner.*

K. N. LEIMER, *Assistant Examiner.*